United States Patent
Huang et al.

(10) Patent No.: US 9,229,545 B2
(45) Date of Patent: Jan. 5, 2016

(54) OPTICAL NAVIGATION APPARATUS AND OPTICAL NAVIGATION METHOD

(71) Applicant: PIXART IMAGING INC., Hsin-Chu (TW)

(72) Inventors: Yu-Hao Huang, Hsin-Chu (TW); Ming-Tsan Kao, Hsin-Chu (TW); Ren-Hau Gu, Hsin-Chu (TW); Hsin-Chia Chen, Hsin-Chu (TW); Yung-Chang Lin, Hsin-Chu (TW); Tsung-Fa Wang, Hsin-Chu (TW)

(73) Assignee: PIXART IMAGING INC. (TW)

( * ) Notice: Subject to any disclaimer, the term of this patent is extended or adjusted under 35 U.S.C. 154(b) by 213 days.

(21) Appl. No.: 13/873,700

(22) Filed: Apr. 30, 2013

(65) Prior Publication Data

US 2014/0160024 A1 Jun. 12, 2014

(30) Foreign Application Priority Data

Dec. 6, 2012 (TW) .............................. 101145795 A

(51) Int. Cl.
*G06F 3/038* (2013.01)
*G06F 3/03* (2006.01)

(52) U.S. Cl.
CPC .............. *G06F 3/038* (2013.01); *G06F 3/0317* (2013.01)

(58) Field of Classification Search
CPC ................................ G06F 3/038; G06F 3/0317
USPC ........................................................ 345/166
See application file for complete search history.

(56) References Cited

U.S. PATENT DOCUMENTS

| 2004/0135825 | A1* | 7/2004 | Brosnan ......................... 345/857 |
| 2006/0007155 | A1* | 1/2006 | Raynor et al. ................. 345/166 |
| 2008/0174787 | A1* | 7/2008 | Teo et al. ....................... 356/614 |
| 2009/0160774 | A1* | 6/2009 | Lee et al. ....................... 345/166 |

FOREIGN PATENT DOCUMENTS

TW 200928880 A 7/2009

OTHER PUBLICATIONS

Taiwanese First Office Action corresponding to Patent Application No. TW101145795; Mailing date: Dec. 2, 2014, with English translation.

\* cited by examiner

*Primary Examiner* — Ariel Balaoing
(74) *Attorney, Agent, or Firm* — Cantor Colburn LLP

(57) ABSTRACT

An optical navigation apparatus and an optical navigation method are provided. The optical navigation apparatus includes a light source unit, an image sensing unit, and a processing unit, wherein the processing unit is electrically connected to the light source unit and the image sensing unit. The light source unit generates a beam of light. The image sensing unit captures a plurality of images within a time interval. The processing unit determines that the beam of light is projected onto a touch object according to the images, calculates a piece of displacement information related to the touch object according to the images, generates a comparison result by comparing the piece of displacement information with a threshold, and sets a displacement resolution of the optical navigation apparatus according to the comparison result.

12 Claims, 5 Drawing Sheets

OPTICAL NAVIGATION APPARATUS AND OPTICAL NAVIGATION METHOD

CROSS-REFERENCE TO RELATED APPLICATIONS

The present invention claims priority under 35 U.S.C. §119 to Taiwan Application No. 101145795 filed Dec. 6, 2012, the entire content of which is incorporated herein by reference.

BACKGROUND OF THE INVENTION

1. Field of the Invention

The present invention relates to an optical navigation apparatus and an optical navigation method. More particularly, the present invention relates to an optical navigation apparatus and an optical navigation method that are capable of adjusting the displacement resolution.

2. Descriptions of the Related Art

Computer mice are used as primary input devices for conventional computer peripheral devices. Users often use the computer mouse to move a cursor shown on a monitor, or even use the computer mouse to select the desired options, applications, etc. Therefore, computer mice have become an important bridge for communication between users and computers. Accordingly, computer mice that adopt various technologies have been developed by manufacturers. Particularly, over recent years, optical navigation apparatuses, such as Optical Finger Mice (OFMs) have also been developed.

Such optical navigation apparatuses operate in the following principle: a beam of light is projected by a light source unit to a touch object (e.g., a reflective surface or a finger), the images are captured by an image sensing unit, and then a cursor shown on the monitor is controlled according to a piece of displacement information derived from the images. Since conventional optical navigation apparatuses have an invariable displacement resolution, operational errors tend to occur when the operation scenario or the operation varies. For example, when the cursor shown on the monitor has been moved to a target that is to be selected by the user, the user must use the optical navigation apparatus again to select the target through clicking. However, when clicking the target, the user's finger will not only move in the vertical direction but also often move in the horizontal direction, which might cause the cursor shown on the monitor to move towards a different position to result in a false click operation.

Accordingly, there is an urgent need in the art to provide an optical navigation apparatus that is capable of adjusting the displacement resolution adaptively according to the different operations of the user.

SUMMARY OF THE INVENTION

To solve the problem with the prior art, the present invention provides an optical navigation apparatus and an optical navigation method.

The optical navigation apparatus of the present invention comprises a light source unit, an image sensing unit and a processing unit. The processing unit is electrically connected to the light source unit and the image sensing unit. The light source unit is configured to generate a beam of light. The image sensing unit is configured to capture a plurality of images within a time interval. The processing unit is configured to determine that the light is projected onto a touch object according to the images, calculate a piece of displacement information related to the touch object according to the images, generate a comparison result by comparing the piece of displacement information with a threshold, and set a displacement resolution of the optical navigation apparatus according to the comparison result.

The optical navigation method of the present invention is for use in an optical navigation apparatus. The optical navigation apparatus comprises a light source unit, an image sensing unit, and a processing unit. The optical navigation method comprises the following steps of: (a) generating, by the light source unit, a beam of light; (b) capturing, by the image sensing unit, a plurality of images within a time interval; (c) determining, by the processing unit, that the light is projected onto a touch object according to the images; (d) calculating, by the processing unit, a piece of displacement information related to the touch object according to the images; (e) generating, by the processing unit, a comparison result by comparing the displacement information with a threshold; and (f) setting, by the processing unit, a displacement resolution of the optical navigation apparatus according to the comparison result.

The present invention can adjust the displacement resolution of the optical navigation apparatus according to the displacement information (e.g., a displacement velocity and/or a displacement amount) related to the touch object for manipulating the optical navigation apparatus. Therefore, by using the optical navigation apparatus and the optical navigation method of the present invention, various operations can be performed more accurately by the user.

The detailed technology and preferred embodiments implemented for the subject invention are described in the following paragraphs accompanying the appended drawings for people skilled in this field to well appreciate the features of the claimed invention.

DESCRIPTION OF THE PREFERRED EMBODIMENT

In the following description, the optical navigation apparatus and the optical navigation method of the present invention will be explained with reference to embodiments thereof. However, these embodiments are not intended to limit the present invention to any environments, applications or implementations described in these embodiments. Therefore, the description of these embodiments is only for the purpose of illustration rather than to limit the present invention. It should be appreciated that in the following embodiments and attached drawings, elements not directly related to the present invention are omitted from depiction.

Figure 1:
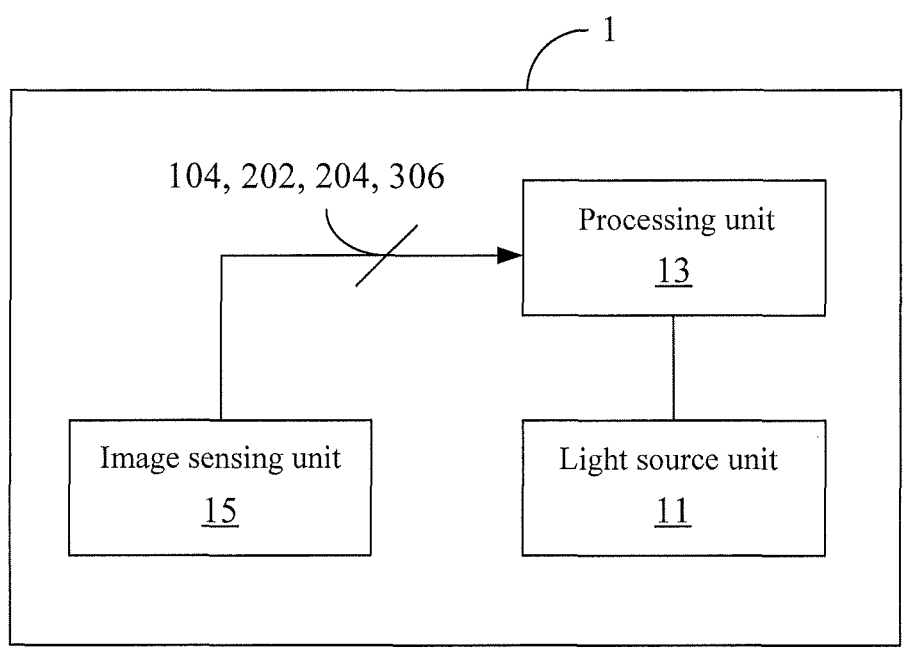
FIG. 1 depicts a schematic view of an optical navigation apparatus 1 according to a first to fourth embodiments.

A first embodiment of the present invention is an optical navigation apparatus 1, a schematic view of which is shown in FIG. 1. The optical navigation apparatus 1 comprises a light source unit 11, a processing unit 13, and an image sensing unit 15. The processing unit 13 is electrically connected to the light source unit 11 and the image sensing unit 15.

The light source unit 11 may be a light emitting diode (LED) or some other light source unit well known to those of ordinary skill in the art. The processing unit 13 may be processors, central processing units (CPUs), microprocessors or other computing units well known to those of ordinary skill in the art. The image sensing unit 15 may be a complementary metal oxide semiconductor (CMOS) photosensitive unit or any image sensing unit well known to those of ordinary skill in the art.

When the optical navigation apparatus 1 is powered on, the light source unit 11 generates a beam of light (not shown). In this embodiment, the image sensing unit 15 captures a plurality of images 104 within a time interval. The processing unit 13 determines that the light is projected onto a touch object (not shown) such as a working surface or a finger pulp according to the images 104. As an example, the processing unit 13 may determine that the light is projected onto the touch object by determining that there are reflected bright spots in the images 104. As another example, the processing unit 13 may determine that the light is projected onto the touch object by determining that an average brightness of the images 104 is greater than a threshold.

Then, the processing unit 13 calculates a piece of displacement information related to the touch object according to the images 104. For example, the piece of displacement information may be a displacement amount and/or a displacement velocity. Thereafter, the processing unit 13 generates a comparison result by comparing the piece of displacement information with a threshold, and sets a displacement resolution of the optical navigation apparatus 1 according to the comparison result. The processing unit 13 sets the displacement resolution to a first resolution when the comparison result is that the displacement information is greater than the threshold, and sets the displacement resolution to a second resolution when the comparison result is that the displacement information is smaller than the threshold.

For example, if a user controls a cursor shown on a monitor by the optical navigation apparatus 1, then the displacement information that is greater than the threshold represents the user moving the cursor, while the displacement information that is smaller than the threshold represents the user intending to click the target. In the aforesaid operation mode, the first resolution may be set higher than the second resolution. This will be illustrated with reference to an example. If the displacement information is the displacement velocity, then the threshold may be set to 0.5 inches per second (IPS) and the first resolution and the second resolution may be set to 800 counts per inch (CPI) and 100 CPI respectively. In this case, if the processing unit 13 determines that the displacement information is greater than 0.5 IPS, then the resolution may be set to 800 CPI; but if the processing unit 13 determines that the displacement information is smaller than 0.5 IPS, then the resolution may be set to 100 CPI.

Through such settings, a relatively high displacement resolution is used by the optical navigation apparatus 1 when the user uses the optical navigation apparatus 1 to move the cursor, so the user can rapidly move the cursor to the desired position. On the other hand, a relatively low displacement resolution is used by the optical navigation apparatus 1 when the user performs a click operation, so a horizontal component generated during the clicking of the user's finger will be significantly reduced. Thereby, the possibility of false click operations will be significantly reduced.

As can be known from the above description, the optical navigation apparatus 1 of this embodiment can adjust the displacement resolution thereof according to variations of the displacement information. In this way, when the user performs different operations (e.g., moving or clicking) by the optical navigation apparatus 1, the optical navigation apparatus 1 can adjust the displacement resolution thereof adaptively so that the operations performed by the user are more accurate.

Figure 2:
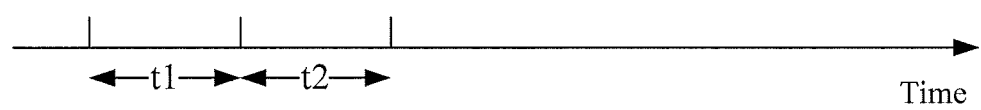
FIG. 2 depicts a schematic view of a sequence of time intervals t1, t2 according to a second embodiment.

FIGS. 1 and 2 show a second embodiment of the present invention. FIG. 2 depicts a schematic view of a sequence of time intervals t1, t2, where the horizontal axis represents time. The second embodiment can accomplish the operations and functions similar to those of the first embodiment, so only the differences between the two embodiments will be detailed hereinbelow.

In this embodiment, the image sensing unit 15 captures a plurality of images 202 within a time interval t1, and the processing unit 13 determines that the light is not projected onto the touch object according to the images 202. As an example, the processing unit 13 may determine that the light is not projected onto the touch object by determining that there is no reflected bright spot in the images 202. As another example, the processing unit 13 may also determine that the light is not projected onto the touch object by determining that an average brightness of the images 202 is smaller than a threshold.

Within the time interval t2 that comes immediately after the time interval t1, the image sensing unit 15 captures a plurality of images 204. The processing unit 13 determines that the light is projected onto the touch object according to the images 204. The optical navigation apparatus 1 knows from the two determination results that the external environment thereof has been changed (i.e., the light that is originally not projected onto the touch object is now projected onto the touch object). Such a change in the external environment represents that the user will likely use the optical navigation apparatus 1 for various operations.

In this embodiment, when the optical navigation apparatus 1 determines that the external environment has been changed, the resolution adjustment mechanism as described in the first embodiment is activated. Specifically, the processing unit 13 calculates a piece of displacement information related to the touch object according to the images 204, generates a comparison result by comparing the piece of displacement information with a threshold, and sets a displacement resolution of the optical navigation apparatus 1 according to the comparison result. The processing unit 13 sets the displacement resolution to a first resolution when the comparison result has a greater displacement compared to that of the threshold and sets the displacement resolution to a second resolution when the comparison result has a smaller displacement compared to that of the threshold. The first resolution is higher than the second resolution.

As can be known from the above description, the second embodiment differs from the first embodiment in that the optical navigation apparatus 1 of the second embodiment activates the resolution adjustment mechanism of the present invention only when determining that the external environment of the optical navigation apparatus 1 is changed.

Figure 3:
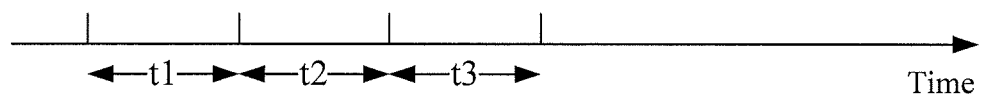
FIG. 3 depicts a schematic view of a sequence of time intervals t1, t2, t3 according to a third and fourth embodiments.

FIGS. 1 and 3 are referenced for a third embodiment of the present invention. FIG. 3 depicts a schematic view of a sequence of time intervals t1, t2, t3, where the horizontal axis represents time. Furthermore, in this embodiment, the user operates the optical navigation apparatus 1 to control the cursor shown on the monitor.

The operations performed and the determination results obtained by the optical navigation apparatus 1 within the time intervals t1, t2 are the same as those in the second embodiment. In brief, the processing unit 13 determines that the light is not projected onto the touch object within the time interval t1 according to the images 202, determines that the light is projected onto the touch object within the time interval t2 according to the images 204, and calculates the displacement information relating to the touch object within the time interval t2 according to the images 204. The other operations in the third embodiment that are identical to those in the second embodiment will not be further described herein.

Within the time interval t3 that comes immediately after the time interval t2, the image sensing unit 15 captures a plurality of images 306. Next, the processing unit 13 determines whether the light is projected onto the touch object according to the images 306, and then performs proper operations according to the determination result.

Suppose that the processing unit 13 determines that the light is projected onto the touch object according to the images 306. In this case, the light is continuously projected onto the touch object within the time intervals t2, t3, and this represents that the user has not performed a click operation. Therefore, the processing unit 13 calculates a displacement amount of the cursor shown on the monitor according to the displacement information calculated within the time interval t2.

Conversely, suppose that the processing unit 13 determines that the light is not projected onto the touch object according to the images 306. In this case, the light is projected onto the touch object only within the time interval t2 of the three time intervals t1, t2, t3, and this represents that the user has performed a click operation. Because the user performs the click operation within the three time intervals t1, t2, t3, the processing unit 13 sets the displacement amount of the cursor shown on the monitor to zero.

As can be known from the above description, the third embodiment can further determine which kind of operation (e.g., moving the cursor shown on the monitor or clicking) is performed by the user using the optical navigation apparatus 1, and control how the cursor shown on the monitor shall move according to the determination result.

FIGS. 1 and 3 illustrate a fourth embodiment of the present invention. The fourth embodiment can accomplish the operations and functions similar to those of the third embodiment, so only differences between the two embodiments will be detailed hereinbelow.

In the fourth embodiment, a threshold related to the time is set, and a length of the time interval t2 is less than the threshold. Furthermore, the processing unit 13 determines that the light is not projected onto the touch object within the time interval t3 according to the images 306. In other words, in the fourth embodiment, the light is projected onto the touch object only within the time interval t2 of the three time intervals t1, t2, t3, and this represents that the user has performed a click operation.

For example, the user may also perform a subsequent click operation after a short time period to accomplish a double-click operation. In consideration of such an operation mode, this embodiment decreases the displacement resolution, which is originally set within the time interval t2 to another displacement resolution after the time interval t3.

As can be known from the above description, the fourth embodiment can further adjust the displacement resolution for the possible double-click operation to achieve a more accurate control effect.

Figure 4:
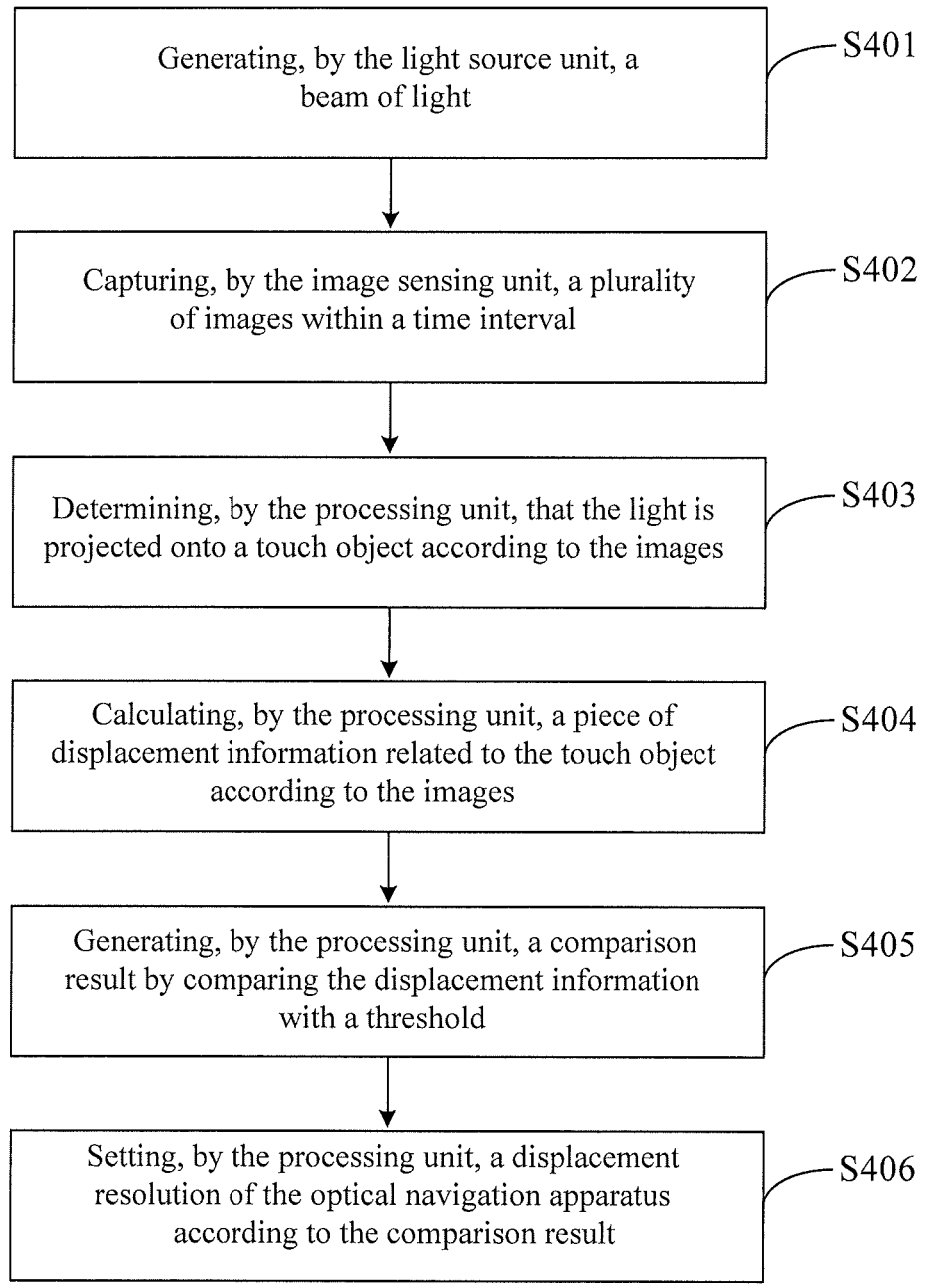
FIG. 4 depicts a flowchart diagram of an optical navigation method according to a fifth embodiment.

A fifth embodiment of the present invention is an optical navigation method, a flowchart diagram of which is shown in FIG. 4. The optical navigation method is for use in an optical navigation apparatus (e.g., the aforesaid optical navigation apparatus 1). The optical navigation apparatus comprises a light source unit, an image sensing unit, and a processing unit.

Firstly, step S401 is executed to generate, by the light source unit, a beam of light. Then, step S402 is executed to capture, by the image sensing unit, a plurality of images within a time interval. Thereafter, step S403 is executed to determine, by the processing unit, that the light is projected onto a touch object according to the images. Next, step S404 is executed to calculate, by the processing unit, a piece of displacement information related to the touch object according to the images. The piece of displacement information may be a displacement velocity and/or a displacement amount. Then, step S405 is executed to generate, by the processing unit a comparison result by comparing the displacement information with a threshold. Finally, step S406 is executed to set, by the processing unit, a displacement resolution of the optical navigation apparatus according to the comparison result. Specifically, step S406 sets the displacement resolution to a first resolution when the comparison result is that the displacement information is greater than the threshold and sets the displacement resolution to a second resolution when the comparison result is that the displacement information is smaller than the threshold, and the first resolution is higher than the second resolution.

In addition to the aforesaid steps, the fifth embodiment can also execute all the operations and functions set forth in the first embodiment. The method in which the fifth embodiment executes these operations and functions can be readily appreciated by those of ordinary skill in the art based on the explanation of the first embodiment, and thus, will not be further described herein.

Figure 5:
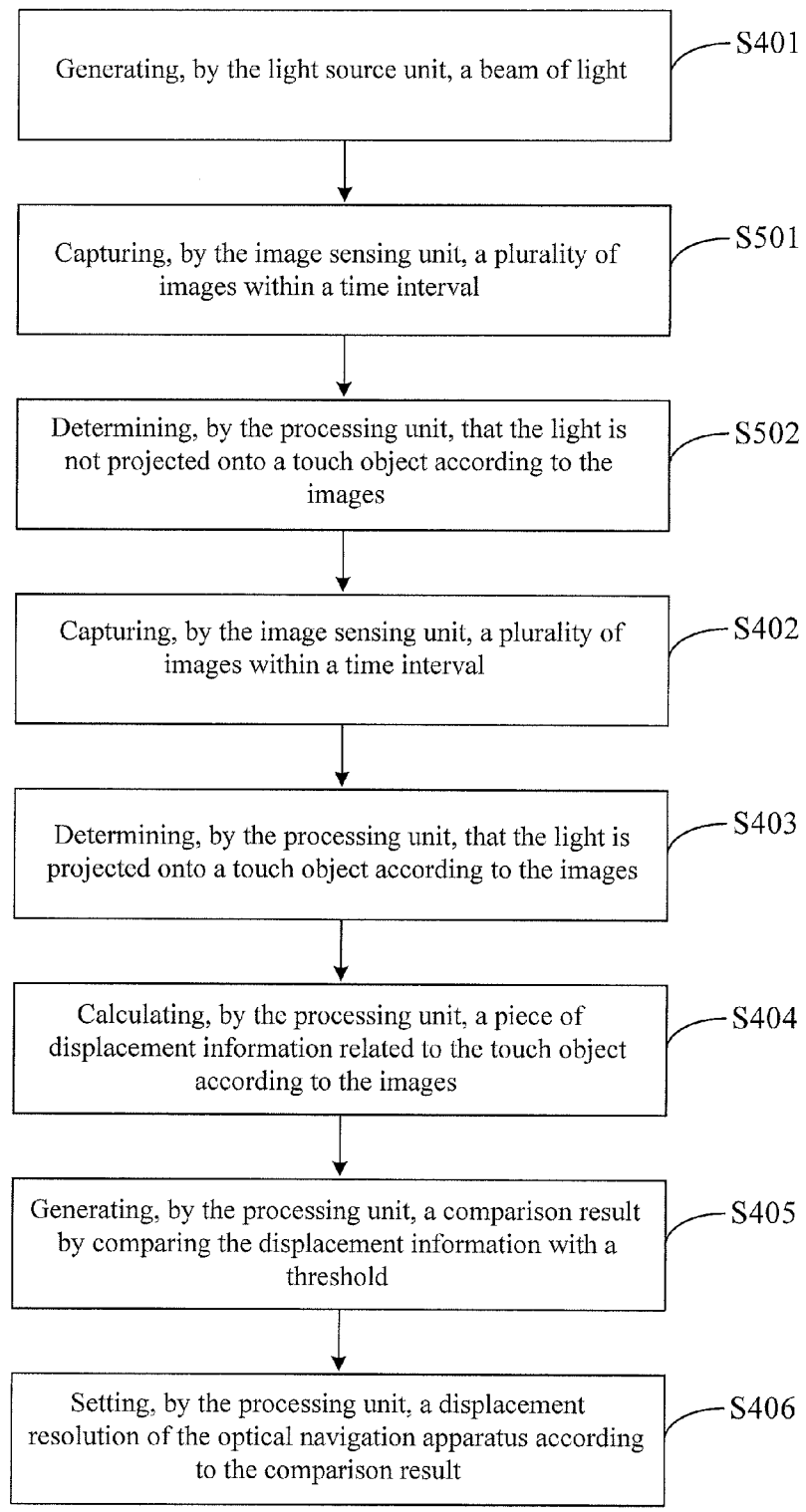
FIG. 5 depicts a flowchart diagram of an optical navigation method according to a sixth embodiment.

A sixth embodiment of the present invention is an optical navigation method, a flowchart diagram of which is shown in FIG. 5. The sixth embodiment differs from the fifth embodiment in that the sixth embodiment additionally executes step S501 and step S502.

First, step S401 is executed to generate, by the light source unit, a beam of light. Then, step S501 is executed to capture, by the image sensing unit, a plurality of images within a time interval. Thereafter, step S502 is executed to determine, by the processing unit, that the light is not projected onto the touch object according to the images. Then, this embodiment executes steps S402 to S406, which have been detailed in the fifth embodiment and thus, will not be further described herein. It shall be appreciated that the time interval described in the step S402 comes immediately after the time interval described in step S501.

In addition to the aforesaid steps, the sixth embodiment can also execute all the operations and functions set forth in the second embodiment. The method in which the sixth embodiment executes these operations and functions can be readily appreciated by those of ordinary skill in the art based on the explanation of the second embodiment, and thus, will not be further described herein.

As can be known from the above description, the sixth embodiment differs from the fifth embodiment in that the sixth embodiment activates the resolution adjustment mechanism of the present invention only when determining that the external environment of the optical navigation apparatus is changed.

Figure 6:
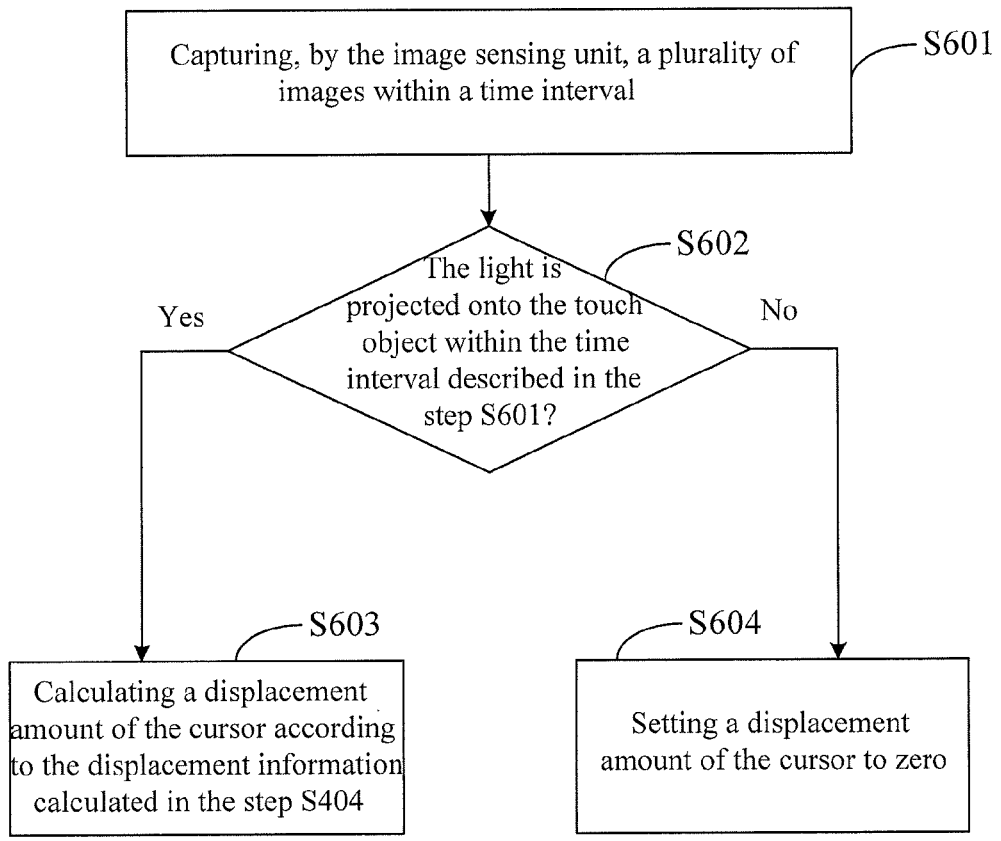
FIG. 6 depicts a partial flowchart diagram of an optical navigation method according to a seventh embodiment.

A seventh embodiment of the present invention is an optical navigation method, a partial flowchart diagram of which is shown in FIG. 6. The seventh embodiment differs from the sixth embodiment in that the seventh embodiment firstly executes all the steps as shown in FIG. 5 and then executes steps shown in FIG. 6. The optical navigation method of the seventh embodiment is used to control a cursor shown on a monitor. Hereinbelow, only the differences between the two embodiments will be described.

Step S601 is executed to capture, by the image sensing unit, a plurality of images within a time interval that comes immediately after the time interval described in the step S402. Then, step S602 is executed to determine, by the processing unit, whether the light is projected onto the touch object within the time interval described in the step S601 according to the images. If the determination result of the step S602 is "yes", then step S603 is executed to calculate, by the processing unit, a displacement amount of the cursor according to the displacement information calculated in the step S404. If the determination result of the step S602 is "no", then step S604 is executed to set, by the processing unit, a displacement amount of the cursor to zero.

In other implementations, if the determination result of the step S602 is "no", then in addition to the step S604, a step may further be executed to decrease, by the processing unit, the displacement resolution (i.e., decrease the displacement resolution set in the step S406 to another displacement resolution) after the time interval described in step S601.

In addition to the aforesaid steps, the seventh embodiment can also execute all the operations and functions set forth in the third and the fourth embodiments. The method in which the seventh embodiment executes these operations and functions can be readily appreciated by those of ordinary skill in the art based on the explanation of the third and the fourth embodiments, and thus will not be further described herein.

As can be known from the above description, the present invention can adjust the displacement resolution of the optical navigation apparatus according to the displacement information (e.g., a displacement velocity and/or a displacement amount) related to the touch object for manipulating the optical navigation apparatus. Furthermore, the present invention also provides various advanced determinations according to the user's behavior pattern of manipulating the optical navigation apparatus. Therefore, by using the optical navigation apparatus and the optical navigation method of the present invention, various operations can be performed more accurately by the user.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. An optical navigation apparatus, comprising:
a light source unit, being configured to generate a beam of light;
an image sensing unit, being configured to capture a plurality of first images within a first time interval and a plurality of second images within a second time interval, wherein the first time interval comes immediately after the second time interval; and
a processing unit, being electrically connected to the light source unit and the image sensing unit and configured to determine that the light is not projected onto a touch object within the second time interval according to the second images and the light is projected onto the touch object within the first time interval according to the first images, activate a resolution adjustment mechanism in response to a change from determining the light being not projected onto the touch object to determining the light being projected onto the touch object, calculate a piece of displacement information related to the touch object according to the first images, generate a comparison result by comparing the piece of displacement information with a first threshold, and set a displacement resolution of the optical navigation apparatus according to the comparison result.

2. The optical navigation apparatus of claim 1, wherein the piece of displacement information is one of a displacement velocity, a displacement amount, and a combination thereof.

3. The optical navigation apparatus of claim 1, wherein the processing unit sets the displacement resolution to a first resolution when the comparison result is that the displacement information is greater than the first threshold, and sets the displacement resolution to a second resolution when the comparison result is that the displacement information is smaller than the first threshold, and the first resolution is higher than the second resolution.

4. The optical navigation apparatus of claim 1, wherein a length of the first time interval is less than a second threshold, the displacement information is smaller than the first threshold, the image sensing unit further captures a plurality of third images within a third time interval that comes immediately after the first time interval, the processing unit further determines that the light is not projected onto the touch object according to the third images, and the processing unit further adjusts the displacement resolution from a first resolution to a second resolution after the third time interval, wherein the first resolution is higher than the second resolution.

5. The optical navigation apparatus of claim 1, wherein the optical navigation apparatus is configured to control a cursor shown on a monitor, the image sensing unit further captures a plurality of third images within a third time interval that comes immediately after the first time interval, the processing unit further determines that the light is projected onto the touch object according to the third images, and the processing unit further calculates a displacement amount of the cursor according to the displacement information.

6. The optical navigation apparatus of claim 1, wherein the optical navigation apparatus is configured to control a cursor shown on a monitor, the image sensing unit further captures a plurality of third images within a third time interval that comes immediately after the first time interval, the processing unit further determines that the light is not projected onto the touch object according to the third images, and the processing unit further sets a displacement amount of the cursor to zero.

7. An optical navigation method for use in an optical navigation apparatus, the optical navigation apparatus comprising a light source unit, an image sensing unit, and a processing unit, the optical navigation method comprising the following steps of:
generating, by the light source unit, a beam of light;
capturing, by the image sensing unit, a plurality of first images within a first time interval and a plurality of second images within a second time interval, wherein the first time interval comes immediately after the second time interval;
determining, by the processing unit, that the light is not projected onto a touch object within the second time interval according to the second images;
determining, by the processing unit, that the light is projected onto the touch object within the first time interval according to the first images;
activating, by the processing unit, a resolution adjustment mechanism in response to a change from determining the light being not projected onto the touch object to determining the light being projected onto the touch object;

calculating, by the processing unit, a piece of displacement information related to the touch object according to the first images;

generating, by the processing unit, a comparison result by comparing the displacement information with a first threshold; and setting, by the processing unit, a displacement resolution of the optical navigation apparatus according to the comparison result.

8. The optical navigation method of claim 7, wherein the displacement information is one of a displacement velocity, a displacement amount, and a combination thereof.

9. The optical navigation method of claim 7, wherein the displacement resolution is set to a first resolution when the comparison result is that the displacement information is greater than the first threshold, and is set to a second resolution when the comparison result is that the displacement information is smaller than the first threshold, and the first resolution is higher than the second resolution.

10. The optical navigation method of claim 7, wherein a length of the first time interval is less than a second threshold, and the displacement information is smaller than the first threshold, the optical navigation method further comprises the following steps of:

capturing, by the image sensing unit, a plurality of third images within a third time interval that comes immediately after the first time interval;

determining, by the processing unit, that the light is not projected onto the touch object according to the third images; and adjusting, by the processing unit, the displacement resolution from a first resolution to a second resolution after the third time interval;

wherein the first resolution is higher than the second resolution.

11. The optical navigation method of claim 7, wherein the optical navigation method is for controlling a cursor shown on a monitor and further comprises the following steps of:

capturing, by the image sensing unit, a plurality of third images within a third time interval that comes immediately after the first time interval;

determining, by the processing unit, that the light is projected onto the touch object according to the third images; and calculating, by the processing unit, a displacement amount of the cursor according to the displacement information.

12. The optical navigation method of claim 7, wherein the optical navigation method is for controlling a cursor shown on a monitor and further comprises the following steps of:

capturing, by the image sensing unit, a plurality of third images within a third time interval that comes immediately after the first time interval;

determining, by the processing unit, that the light is not projected onto the touch object according to the third images; and setting, by the processing unit, a displacement amount of the cursor to zero.

* * * * *